United States Patent
Toyomura

(10) Patent No.: US 7,593,054 B2
(45) Date of Patent: Sep. 22, 2009

(54) FOCUSING APPARATUS

(75) Inventor: Kouichi Toyomura, Osaka (JP)

(73) Assignee: Panasonic Corporation, Osaka (JP)

( * ) Notice: Subject to any disclaimer, the term of this patent is extended or adjusted under 35 U.S.C. 154(b) by 587 days.

(21) Appl. No.: 10/489,487

(22) PCT Filed: Aug. 4, 2003

(86) PCT No.: PCT/JP03/09846

§ 371 (c)(1),
(2), (4) Date: Aug. 11, 2004

(87) PCT Pub. No.: WO2004/015476

PCT Pub. Date: Feb. 19, 2004

(65) Prior Publication Data

US 2004/0257461 A1 Dec. 23, 2004

(30) Foreign Application Priority Data

Aug. 7, 2002 (JP) .............................. 2002-229772
Aug. 7, 2002 (JP) .............................. 2002-229773

(51) Int. Cl.
*H04N 5/232* (2006.01)
(52) U.S. Cl. ..................................... 348/349; 348/351
(58) Field of Classification Search ................. 348/345, 348/348, 357, 349, 356, 351
See application file for complete search history.

(56) References Cited

U.S. PATENT DOCUMENTS

| 4,473,743 | A |   | 9/1984  | Ishikawa |
| 5,212,516 | A |   | 5/1993  | Yamada et al. |
| 5,249,058 | A | * | 9/1993  | Murata et al. ................ 348/354 |
| 7,079,187 | B1 | * | 7/2006  | Yasuda ........................ 348/345 |
| 2002/0154241 | A1 | * | 10/2002 | Ohkawara .................... 348/345 |

FOREIGN PATENT DOCUMENTS

| EP | 0 404 523 A2 | 12/1990 |
| EP | 03 78 4509 | 3/2009 |
| JP | 57-188026 | 11/1982 |
| JP | 62-36619 | 2/1987 |
| JP | 62-239327 | 10/1987 |
| JP | 2-280579 | 11/1990 |

(Continued)

OTHER PUBLICATIONS

Japanese International Search Report for PCT/JP03/09846, dated Oct. 21, 2003.

(Continued)

*Primary Examiner*—Tuan V Ho
(74) *Attorney, Agent, or Firm*—RatnerPrestia

(57) ABSTRACT

A focusing apparatus including a focus signal detection circuit that generates a focus signal indicating the degree of focusing, an in-focus direction decision circuit that generates an in-focus direction signal indicating whether a focusing lens moved for focusing is on a far side or near side viewed from the in-focus position using the generated focus signal at predetermined time intervals, in-focus direction memory for storing the in-focus direction signal generated at predetermined time intervals, and a lens control amount calculation circuit and an in-focus vicinity decision circuit that controls the movement of the focusing lens based on a stored immediately preceding predetermined number of in-focus direction signals according to a predetermined rule.

7 Claims, 10 Drawing Sheets

FOREIGN PATENT DOCUMENTS

| | | |
|---|---|---|
| JP | 3-247178 | 11/1991 |
| JP | 4-207479 | 7/1992 |
| JP | 5-2114 | 1/1993 |
| JP | 6-86143 | 3/1994 |
| JP | 9-043483 | 2/1997 |
| JP | 2003-215438 | 7/2003 |

OTHER PUBLICATIONS

Chinese Office Action for CN 03801014.3, dated Apr. 7, 2006.

* cited by examiner

US 7,593,054 B2

FOCUSING APPARATUS

THIS APPLICATION IS A U.S. NATIONAL PHASE OF PCT INTERNATIONAL APPLICATION PCT/JP03/09846.

TECHNICAL FIELD

The present invention relates to a focusing apparatus, focusing method, program and recording medium which automatically adjusts an object image to be taken by an image pickup apparatus such as a video camera and digital still camera to an optimal focal position.

BACKGROUND ART

For an image pickup apparatus such as a video camera and digital still camera, an auto focusing function is one of the important functions for improving operability. One of typical methods of realizing the function is called "hill-climbing method." This method extracts a medium/high frequency component from an image signal obtained by image taking and controls the lens position so that the level becomes a maximum. This system is based on the principle that a circle of confusion increases as the lens goes away from a focal position and the contrast of the object image formed through the lens decreases as it goes away from the focal position. The medium/high frequency component of the image signal is a signal that corresponds to the degree of the contrast of this object image.

This system is classified as a passive system, which requires no dedicated light-emitting apparatus as compared with an active system such as an "infrared system,". This system further has a feature of being capable of high precision focusing because it receives little influence from the distance from the object. Furthermore, since the hill-climbing method uses an image signal itself, it requires no other optical system which is required by another passive system called a "phase difference detection system." For this reason, this system provides cost reduction and miniaturization.

On the other hand, this system leaves much to be desired in handling objects and scenes such as (1) objects with low contrast whose focus signal level relatively decreases, (2) scenes with a mixture of far and near objects with a plurality of maximum points of a focus signal and (3) scenes under low illumination susceptible to noise in an image signal, etc.

A conventional configuration of a hill-climbing type auto focusing apparatus will be explained with reference to drawings.

FIG. 7 shows a configuration of a conventional auto focusing apparatus.

An image-taking lens 1 made up of a plurality of lenses including a focusing lens 1a is position-controlled by a lens driving section 6 (e.g., stepping motor and its driving circuit). An optical image of an object is formed on an image pickup element 2 (e.g., CCD) which becomes image pickup means through the image-taking lens 1.

An image pickup element 2 photoelectrically converts the formed object image and outputs it as a time-series signal. An image signal generation circuit 3 applies various types of signal processing to the output of the image pickup element 2 and outputs a predetermined image signal CO (e.g., NTSC signal). Here, the various types of signal processing refer to analog/digital conversion, gain control, γ correction, brightness signal generation processing, color-difference signal generation processing, etc., and further include aperture correction, noise reduction, etc., as required.

A focus signal detection circuit 4 integrates a brightness signal YE out of the time-series signal output from the image signal generation circuit 3 using a low pass filter 41 (hereinafter referred to as "LPF"), removes the noise component and outputs a BP signal which has been differentiated by a high pass filter 42 (hereinafter referred to as "HPF").

A peak detection circuit 43 converts this signal to an absolute value, detects a peak value (PK signal) of a signal corresponding to a preset area (e.g., central 50% area of image-taking screen) in every horizontal scanning period and an addition circuit 44 further adds up these peak values for a vertical scanning period to generate a focus signal VF. This focus signal VF becomes a representative field value corresponding to the degree of the contract of the object image.

Here, FIG. 8 shows a schematic view illustrating an image of the operation of the focus signal detection circuit 4 for detecting a focus signal VF from the image pickup screen. The same figure shows an example of an object having vertical stripes of "white, black, white." FIG. 8(a) shows an out-of-focus state of the object and FIG. 8(b) shows an in-focus state of the object.

In FIG. 8(a), when the object is out of focus as shown in the first illustration from the left, the signal level of the detection area 32 which is a substantially central 50% area of the image-taking screen 31 for a horizontal scanning period is detected and differentiated by the HPF 42 and the resulting BP signal is as shown in the second illustration from the left. When this signal is converted to an absolute value by the peak detection circuit 43, the resulting signal is as shown in the third illustration from the left and the peak value (PK signal) at that time is output to the addition circuit 44. The fourth illustration from the left indicates the peak value by a fine line arrow and the length thereof indicates the magnitude of the peak value. Likewise, peak values in the detection area 32 are detected for every horizontal scanning period, and the addition circuit 44 adds up those peak values for a vertical scanning period to obtain a focus signal VF. The magnitude of the focus signal VF is indicated by a bold line arrow in the fourth illustration from the left. The length of this bold line arrow indicates the magnitude of the focus signal VF.

Then, in an in-focus state when the object is in focus as with the first illustration from the left in FIG. 8 (b) a BP signal obtained by detecting and differentiating the signal level of the detection area 32 which is the substantially central 50% area on the image-taking screen 31 for a horizontal scanning period by the HPF 42 is as shown in the second illustration from the left. When the peak detection circuit 43 converts this signal to an absolute value, the resulting signal is as shown in the third illustration from the left and the peak value (PK signal) at that moment is output to the addition circuit 44. The fourth illustration from the left indicates the peak value using a fine line arrow and the length thereof indicates the magnitude of the peak value. Likewise, peak values in the detection area 32 are detected for every horizontal scanning period, and the addition circuit 44 adds up those peak values for a vertical scanning period to obtain a focus signal VF. The magnitude of the focus signal VF is indicated by a bold line arrow in the fourth illustration from the left. The length of this bold line arrow indicates the magnitude of the focus signal VF.

Thus, there is a difference in the signal level detected by the HPF 42 between the out-of-focus state and in-focus state and a focus signal resulting from the addition of peak values of this signal naturally has a difference. As shown in this figure, the focus signal VF in the in-focus state is greater than that in the out-of-focus state.

Returning to FIG. 7, the lens control circuit 5 generates a variation component ΔVF by calculating a difference between this focus signal VF and a past focus signal, for example, a focus signal obtained one field ahead by a differential circuit 501. Seeing the sign of this variation component ΔVF, an in-focus direction decision circuit 502 decides whether the in-focus direction is on a far side or near side relative to the actual point or whether it is the same as or opposite to the immediately preceding moving direction. A lens control amount calculation circuit 503 adds a predetermined amount of movement to this moving direction and outputs the result as an amount of lens control to the lens driving section 6. The lens driving section 6 drives the focusing lens 1*a* based on this amount of control. Focusing is automatically performed by these configurations and operations.

Here, the amount of lens movement at the lens control amount calculation circuit 503 in the lens control circuit 5 will be explained in more detail.

When the amount of movement of the focusing lens 1*a* is increased, the moving speed of the focusing lens 1*a* increases. However, when the moving speed is too high, the stepping motor cannot keep track of the correlation between the amount of lens control and the moving position, possibly causing a so-called out-of-synchronization phenomenon. In addition, when the amount of movement of the focusing lens 1*a* is too large, a hunting phenomenon in which the lens moves back and forth a great deal around the in-focus position becomes noticeable, considerably deteriorating the quality of the image. On the contrary, when the amount of movement is too small, it takes quite a long time to reach the in-focus position, deteriorating responsivity.

Therefore, a method of deciding the amount of lens movement according to the level of the focus signal VF is considered. FIG. 9 shows a hill-climbing curve of a focus signal VF which changes depending on the object. In FIG. 9, the X-axis shows the lens position of the focusing lens 1*a* and shows the focal position substantially at the center. The Y-axis shows the level of the focus signal VF. The characteristic of an object A shows a characteristic when the image-taking condition is good (when contrast and illumination are sufficient), while the characteristic of an object B shows a state in which the image-taking condition of the object is bad (low contrast, low illumination, etc.). LEV1 and LEV2 show threshold levels and MV1 to MV3 show amounts of movement of the lens. For example, as shown in FIG. 9, the threshold level LEV1 and threshold level LEV2 (LEV2>LEV1) are specified beforehand, and if the relationship between the threshold level LEV1, threshold level LEV2 and focus signal VF is VF<LEV1, then the amount of movement is assumed to be MV1 and if LEV1≦VF<LEV2, the amount of movement is assumed to be MV2 and if LEV2≦VF, the amount of movement is assumed to be MV3. Here, suppose the relationship between the amounts of movements MV1 to MV3 is MV1>MV2>MV3. FIG. 9 indicates the amount of movement of MV1 to MV3 by the length of the arrow.

In FIG. 9, in the case of the object A, for example, when the lens position is P1, the focus signal VF is less than LEV1, and therefore the lens moves to the in-focus position by the amount of movement MV1. When the lens moves to the in-focus position and the level of the focus signal VF increases and exceeds LEV1 (the lens position at this time is P2), the lens moves to the in-focus position by replacing the amount of movement MV1 by MV2 which is a smaller amount of movement than MV1. Furthermore, when the level of the focus signal VF exceeds LEV2 (the lens position at this time is P3), the lens moves by replacing MV2 by MV3 which is a smaller amount of movement than MV2. Then, when the lens is moved to P4 past the in-focus position, the level of the focus signal VF is decreased, and therefore the lens is moved backward and the lens is brought closer to the in-focus position. The position where the level of the focus signal VF reaches the highest point is the in-focus position. Thus, changing the amount of movement of the focusing lens 1*a* according to the level of the focus signal VF solves the above described problem.

However, the level of the focus signal VF varies depending on the condition (contrast and illumination, etc.) of the object even when the distance from the object is the same. Therefore, as with the object B in FIG. 9, for example, even if the focusing lens 1*a* is near the in-focus position, the amount of movement becomes MV2 which is greater than MV3 and the quality of the image (moving image) may be damaged by hunting.

Furthermore, when a high resolution still image is taken by a still image taking function of a digital still camera or video camera, it is preferable from the standpoint of resolution, etc., that the object image taken when the shutter is released be an object image exposed to light while the lens is stopped. Furthermore, as the number of pixels of the still image increases, higher resolution is required, and therefore higher in-focus accuracy is required.

FIG. 10 is a schematic view of the behavior of the lens movement in the case of the object B shown in FIG. 9 and the horizontal axis shows the time until the lens is stopped and the vertical axis shows the lens position. In the conventional configuration, the accuracy of stopping of the lens strongly depends on the predetermined amount of lens movement (MV1 to MV3) and it is not possible to reduce the amount of movement for the same reason as that of a moving image, and therefore the accuracy of stopping may deteriorate and the quality (especially resolution) of the still image may deteriorate.

In the conventional configuration, the lens is stopped after a predetermined time.

DISCLOSURE OF THE INVENTION

A possible measure against low contrast objects or scenes under low illumination is a method of extracting a medium/high frequency component from an image signal as two types of focus signals in different frequency bands and selectively using those signals as signals of a hill-climbing operation by judging the situation of the object according to the signal level, etc.

Furthermore, a possible measure against scenes having a mixture of far and near objects is a method of limiting the detection area of a focus signal to part of the range of the screen and thereby avoiding the state of a mixture of far and near objects. Furthermore. a possible measure against noise is a method of specifying a noise level based on a focus signal beforehand when there is no contrast. moving the lens more when the focus signal is equal to or below the noise level or causing fine vibration (hereinafter referred to as "wobbling"), extracting the variation component of the focus signal and identifying the in-focus direction.

As a method of improving focusing accuracy when taking a still image, it is possible to adopt a so-called "scanning system" which allows detection in two stages; when the release button is half depressed and when the release button is fully depressed and moves the lens to search for a maximum value of a focus signal when the release button in a half-depressed state, but in this case, a time lag is generated after the user presses the release button until an object image is actually taken, and therefore the user may miss the right moment for releasing the shutter.

The present invention has been implemented in view of the above described conventional problems and it is an object of the present invention to provide a focusing apparatus, focusing method, program and recording medium for reducing disturbance, etc., of an image caused by hunting and picking up a high-definition moving image and high resolution still image.

A first aspect is a focusing apparatus comprising:

focus signal generating means of generating a focus signal indicating the degree of focusing;

in-focus direction signal generating means of generating an in-focus direction signal indicating whether a focusing lens moved for focusing is on a far side or near side viewed from an in-focus position using said generated focus signal at predetermined time intervals;

in-focus direction signal storing means of storing said in-focus direction signal generated at the predetermined time intervals; and focusing lens movement controlling means of controlling movement of said focusing lens based on said stored immediately preceding predetermined number of in-focus direction signals according to a predetermined rule.

A second aspect is the focusing apparatus according to the first aspect, wherein said predetermined rule is a rule to reduce the speed of movement of said focusing lens as the difference between (1) the number of in-focus direction signals, out of said stored immediately preceding predetermined number of in-focus direction signals, indicating that said moved focusing lens is on the far side viewed from the in-focus position and (2) the number of in-focus direction signals, out of said stored immediately preceding predetermined number of in-focus direction signals, indicating that said moved focusing lens is on the near side viewed from the in-focus position, is decreased.

A third aspect is the focusing apparatus according to the second aspect, wherein the movement of said focusing lens is stopped (a) after a predetermined time has elapsed after said difference falls below a predetermined value or (b) after said difference falls below a predetermined value a predetermined number of times consecutively.

A fourth aspect is the focusing apparatus according to the third aspect, further comprising:

focus signal level data storing means of storing focus signal level data on the focus signal level of a focus signal when said stored in-focus direction signal is generated;

focusing lens position data storing means of storing focusing lens position data on the position of said focusing lens where a focus signal having a focus signal level at which said focus signal level data is stored is generated; and focusing lens position correcting means of correcting the position of said focusing lens whose movement is stopped to the position of said focusing lens, of the positions of said focusing lens at which said focusing lens position data is stored, where a focus signal having a maximum focus signal level out of the focus signal levels at which said focus signal level data is stored is generated.

A fifth aspect is the focusing apparatus according to the third aspect, wherein only when the focus signal level of said generated focus signal is equal to or higher than a predetermined value, the movement of said focusing lens is controlled based on said stored immediately preceding predetermined number of in-focus direction signals according to said predetermined rule.

A sixth aspect is the focusing apparatus according to the third aspect, further comprising focusing lens position detecting means of detecting the position of said moved focusing lens, wherein the movement of said focusing lens is controlled considering said detected position of the focusing lens.

A seventh aspect is a focusing method comprising:

a focus signal generating step of generating a focus signal indicating the degree of focusing;

an in-focus direction signal generating step of generating an in-focus direction signal indicating whether a focusing lens moved for focusing is on a far side or near side viewed from an in-focus position using said generated focus signal at predetermined time intervals;

an in-focus direction signal storing step of storing said in-focus direction signal generated at the predetermined time intervals; and a focusing lens movement controlling step of controlling movement of said focusing lens based on said stored immediately preceding predetermined number of in-focus direction signals according to a predetermined rule.

An eighth aspect is a program for causing a computer to execute the focusing method according to the seventh aspect comprising a focus signal generating step of generating a focus signal indicating the degree of focusing, an in-focus direction signal generating step of generating an in-focus direction signal indicating whether a focusing lens moved for focusing is on a far side or near side viewed from an in-focus position using said generated focus signal at predetermined time intervals, an in-focus direction signal storing step of storing said in-focus direction signal generated at the predetermined time intervals, and a focusing lens movement controlling step of controlling movement of said focusing lens based on said stored immediately preceding predetermined number of in-focus direction signals according to a predetermined rule.

A ninth aspect is a recording medium that stores the program according to the eighth aspect and can be processed by a computer.

DESCRIPTION OF SYMBOLS

Figure 1:
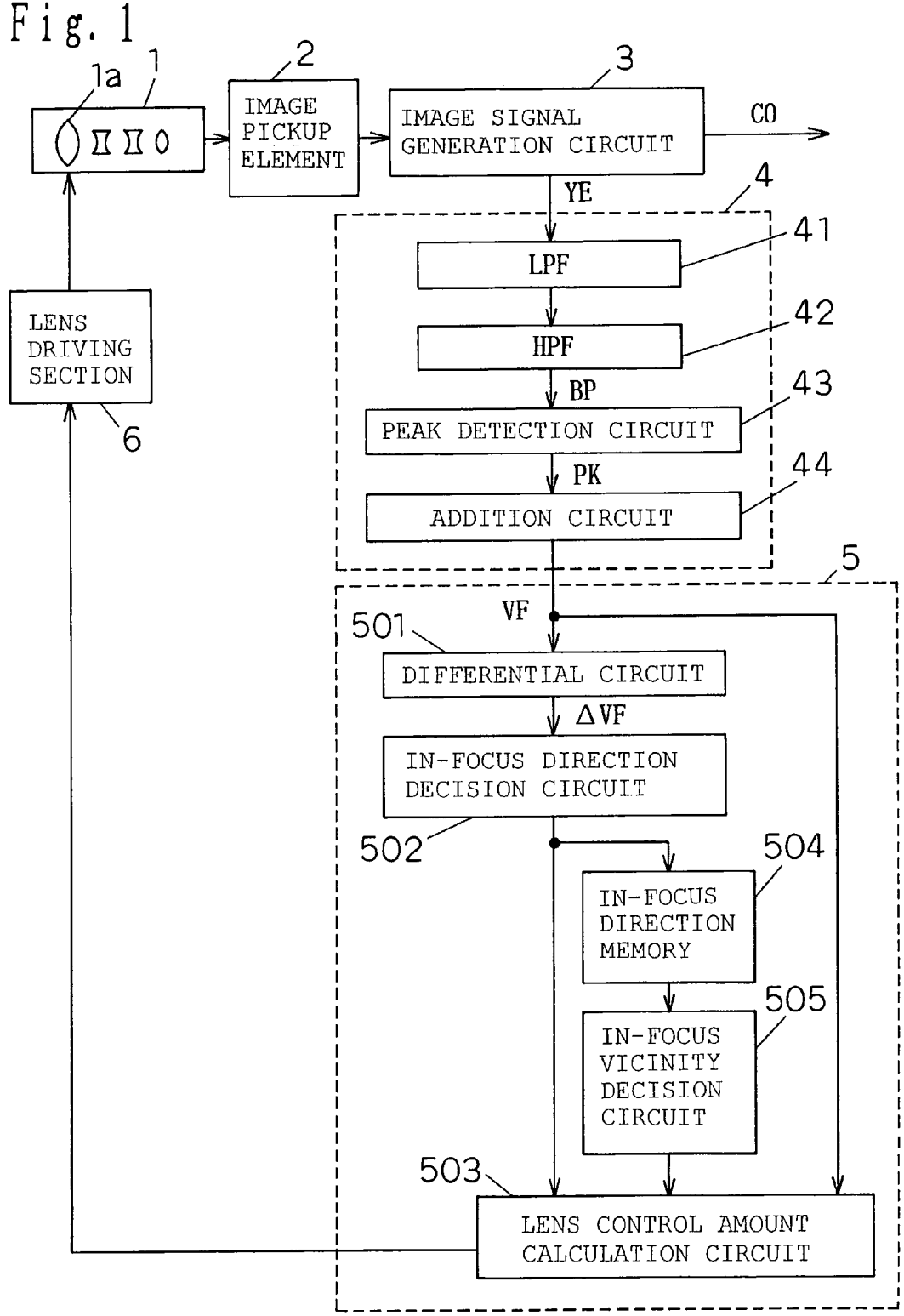
FIG. 1 is a block diagram showing a configuration of an auto focusing apparatus according to Embodiment 1 of the present invention.

1 Image-taking lens
1a Focusing lens
2 Image pickup section
3 Image signal generation circuit
4 Focus signal detection circuit
5 Lens control circuit
502 In-focus direction decision circuit
503 Lens control amount calculation circuit
504 In-focus direction memory
505 In-focus vicinity decision circuit
506 In-focus vicinity data memory
6 Lens driving section

BEST MODE FOR CARRYING OUT THE INVENTION

With reference now to the attached drawings, embodiments of the present invention will be explained below.

EMBODIMENT 1

First, a configuration of an auto focusing apparatus of this embodiment will be explained mainly with reference to FIG. 1.

FIG. 1 is a block diagram showing a configuration of an auto focusing apparatus according to the Embodiment 1 of the present invention.

Figure 7:
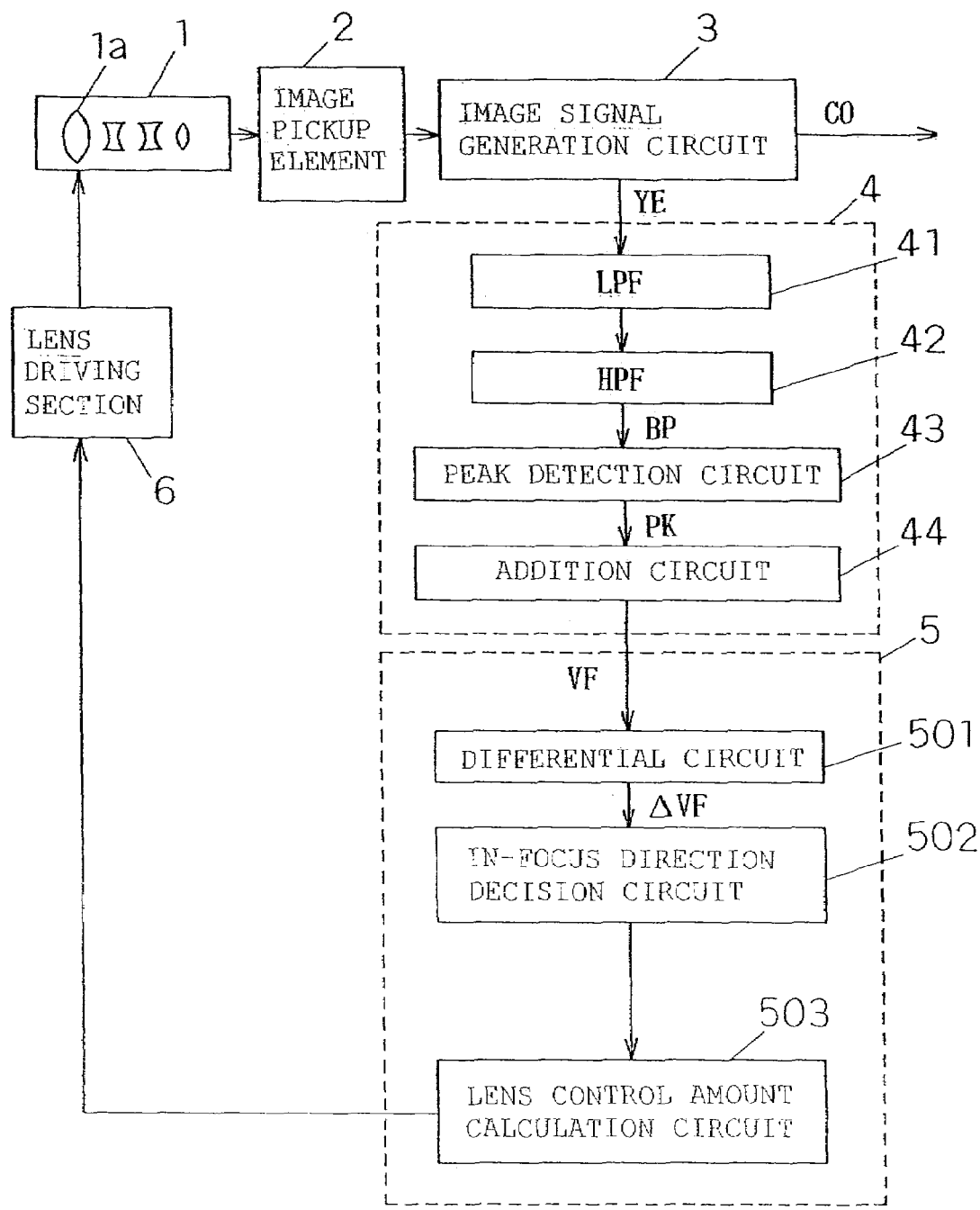
FIG. 7 is a block diagram showing a configuration of a conventional auto focusing apparatus.
Figures 8A, 8B:
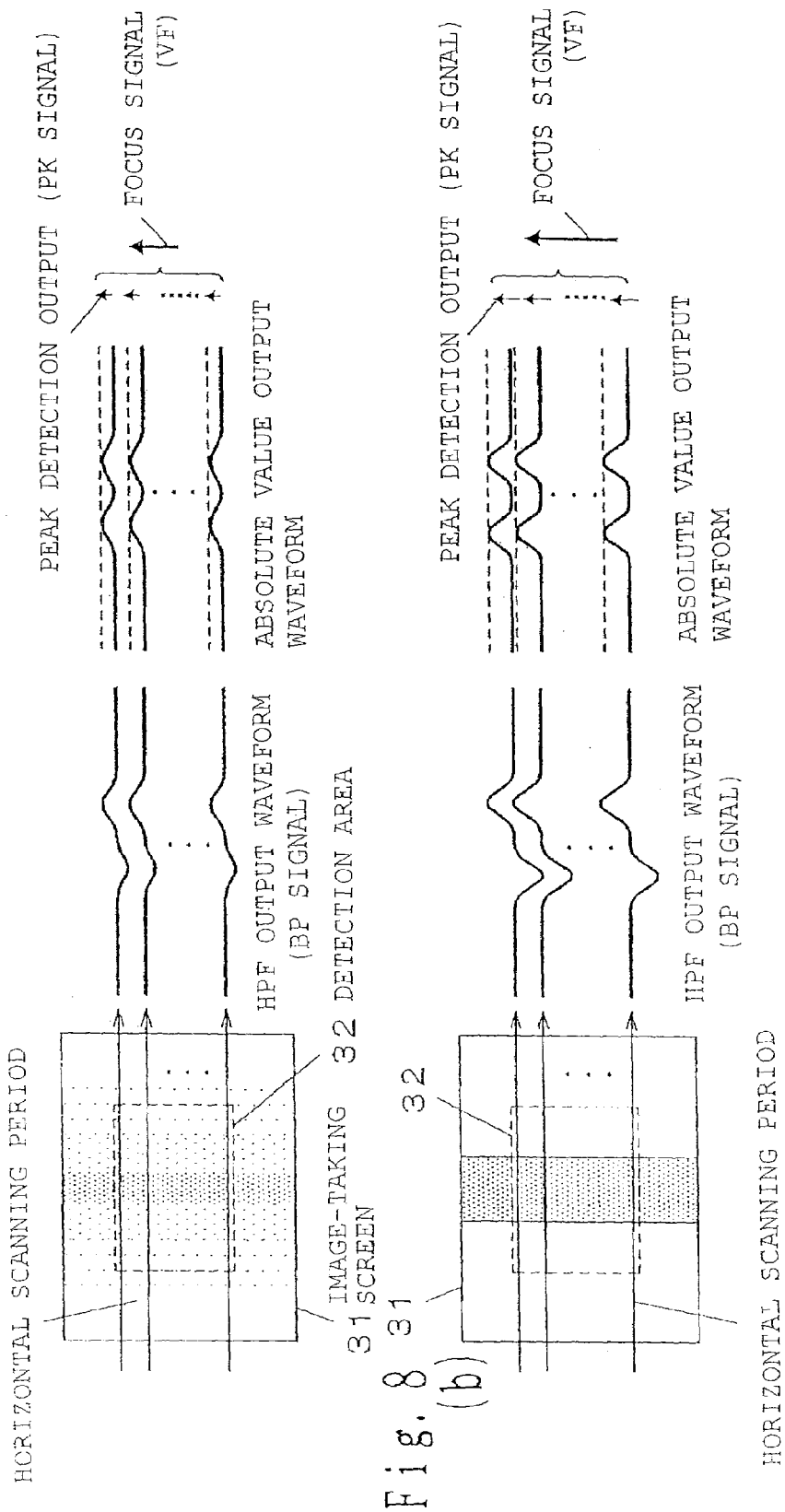
FIG. 8(a) is a schematic view (No. 1) of a conventional focus signal detection operation.
FIG. 8(b) is a schematic view (No. 2) of a conventional focus signal detection operation.
Figure 9:
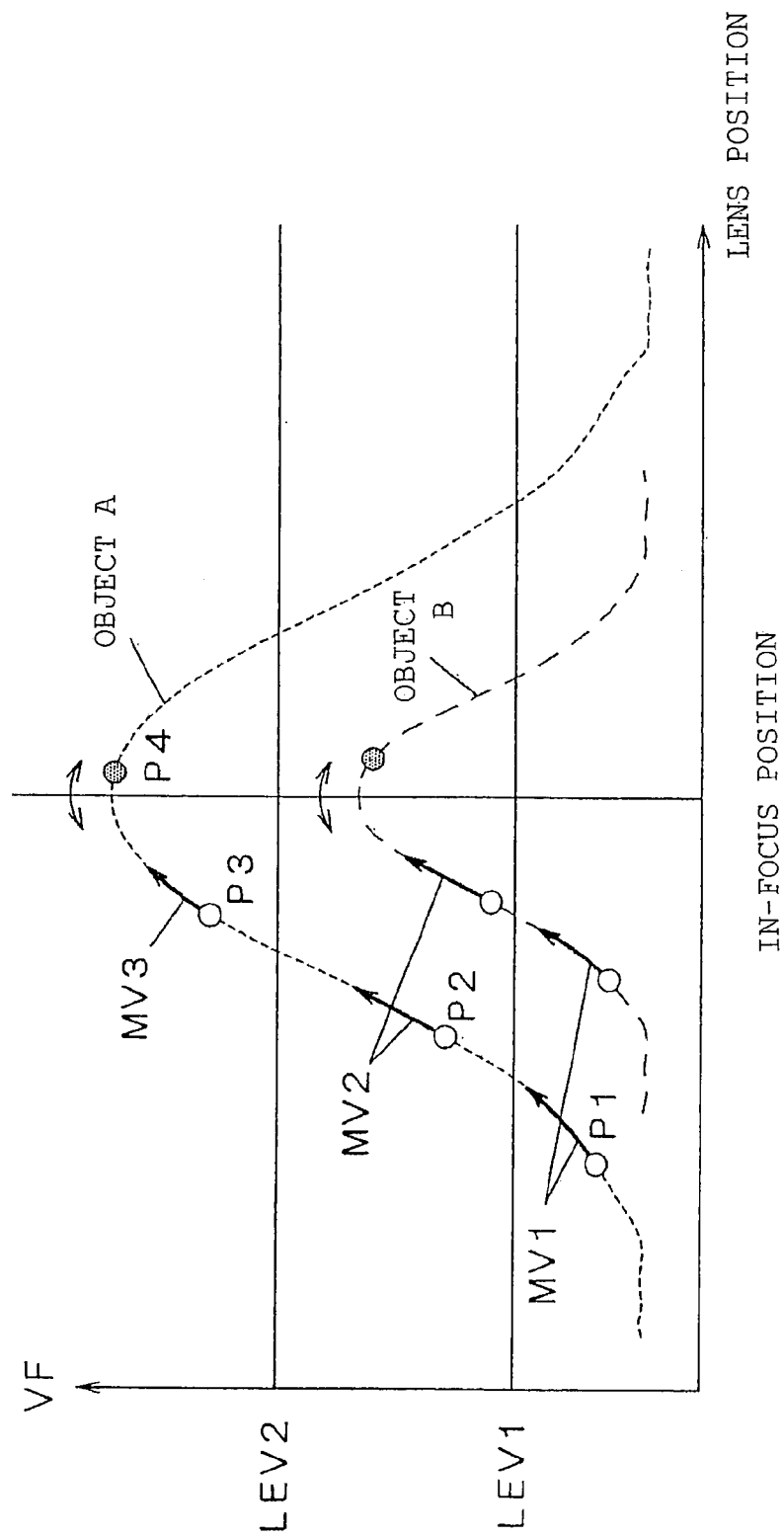
FIG. 9 is a schematic view of a hill-climbing operation through conventional lens movement amount control.
Figure 10:
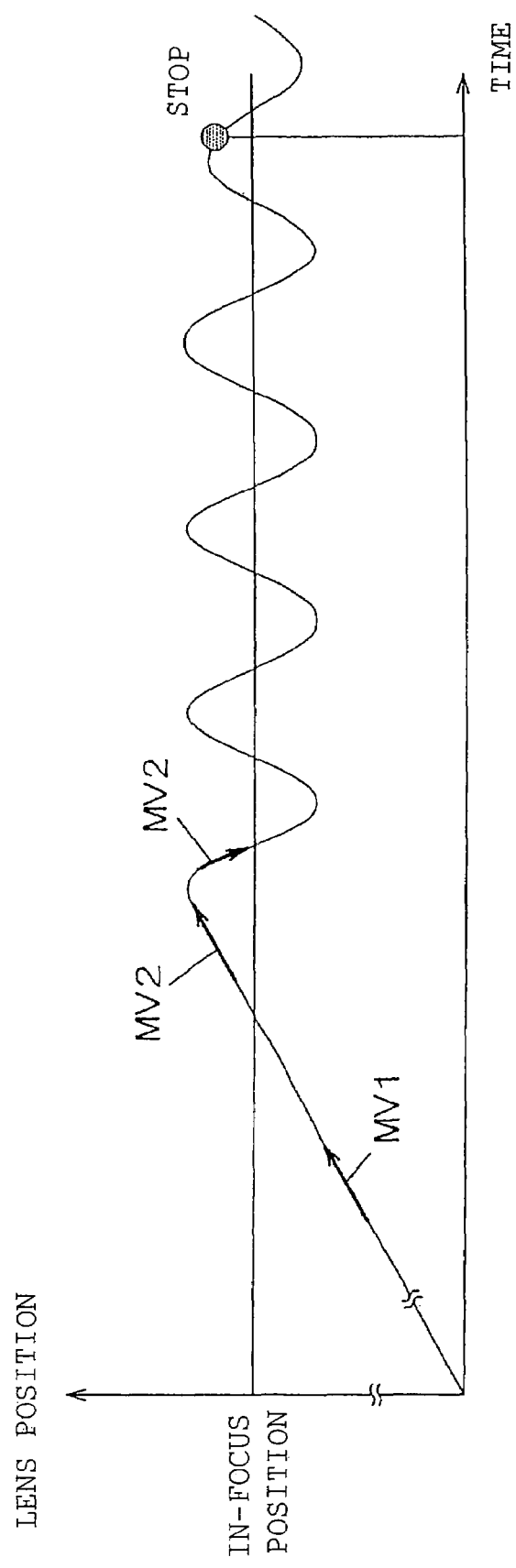
FIG. 10 is a schematic view of the lens 1a in the case of a conventional object B.

In FIG. 1, parts having the same configuration and function as those in the conventional auto focusing apparatus already explained (see FIG. 7) are assigned the same reference numerals.

As will be explained in detail below, an in-focus direction memory 504 and an in-focus vicinity decision circuit 505 are the means of performing important functions in this embodiment which are not available in the conventional auto focusing apparatus.

Reference numeral 1 denotes an image-taking lens made up of a plurality of lens units, which consists of a zoom lens, focus lens, etc., placed on the optical axis. Reference numeral 1a denotes a focusing lens which forms part of the image-taking lens 1 (in the present Specification, the focusing lens may be simply referred to as a "lens") and moving it in the direction of the optical axis can realize focusing.

Reference numeral 2 denotes an image pickup element which is the image pickup means that forms an image of an optical signal of an object which enters through the image-taking lens 1, converts it to an electrical signal and outputs it as a time-series signal and consists of a solid image pickup element such as a CCD (Charge Coupled Device).

Reference numeral 3 denotes an image signal generation circuit which is the image signal generating means that applies various types of signal processing to the output signal from the image pickup element 2 and the various types of signal processing refer to analog/digital conversion, gain control, γ correction, brightness signal generation processing, color-difference signal generation processing, etc., and also apply aperture correction, noise reduction, etc., as required.

Reference numeral 4 denotes a focus signal detection circuit which is the focus signal detecting means and consists of a low pass filter (hereinafter referred to as "LPF") 41, a high pass filter (hereinafter referred to as "HPF"), a peak detection circuit 43 and an addition circuit 44. The LPF 41 integrates a brightness signal of the time-series signal output from the image signal generation circuit 3 and removes a noise component. The HPF 42 outputs a BP signal which is the output obtained by differentiating the output signal from the LPF 41. The peak detection circuit 43 converts the signal from the HPF 42 to an absolute value and detects a peak value (PK signal) of the signal corresponding to a preset area (e.g., central 50% of the image-taking screen) for every horizontal scanning period. The addition circuit 44 adds up the peak values of the signal from the peak detection circuit 43 for a vertical scanning period and generates a focus signal VF.

Reference numeral 5 denotes a lens control circuit which is the lens controlling means and generates a variation component AVF by calculating a difference between this focus signal VF and a past focus signal, for example, a focus signal obtained one field ahead by a differential circuit 501 which is the differential means. An in-focus direction decision circuit 502 which is the in-focus direction deciding means decides whether the in-focus direction is on a far side or near side relative to the actual point or whether it is the same as or opposite to the immediately preceding moving direction by seeing the sign of this variation component AVF. At this time, when the lens driving is accompanied by a wobbling operation to decide the direction, if the wobbling frequency is 30 Hz, two fields correspond to one-cycle vibration, and therefore after calculating a difference from the focus signal obtained one field ahead, the sign is inverted alternately for each field and used to decide the in-focus direction. In deciding the direction, when the sign is positive, the far side is decided to be the in-focus direction and when the sign is negative, the near side is decided to be the in-focus direction.

The in-focus direction memory 504 stores a plurality of (e.g., 20) in-focus direction signals resulting from the decision at the in-focus direction decision circuit 502 in the time-series order. When the number of signals exceeds 20, data is overwritten starting from the oldest data, and thereby the latest 20 data pieces are always stored.

An in-focus vicinity decision circuit 505 which is the in-focus vicinity deciding means evaluates these 20 in-focus direction data pieces and decides whether the in-focus position is close or not. As the decision method, for example, 20 data pieces are counted direction by direction and when data in each direction is a predetermined threshold value (e.g., 5 or more data pieces on the far side and 5 or more data pieces on the near side) ,the lens is decided to be close to the in-focus position.

A lens control amount calculation circuit 503 which is the lens control amount calculating means decides the moving direction of the lens 1a from the result obtained by the in-focus direction decision circuit 502, decides an amount of lens movement from the level of the focus signal VF and the result of the in-focus vicinity decision circuit 505 and outputs the amount of lens movement to a lens driving section 6. The lens driving section 6 is driven by this amount of control and moves the focusing lens 1a. Focusing is automatically performed by these configurations and operations.

In this way, it is possible to adaptively change the amount of movement of the lens 1a according to whether the in-focus position is close or not. The differential circuit 501, in-focus direction decision circuit 502, lens control amount calculation circuit 503, in-focus direction memory 504 and in-focus vicinity decision circuit 505 make up the lens control circuit 5.

Then, the operation of the auto focusing apparatus of this embodiment will be explained. While explaining the operation of the auto focusing apparatus of this embodiment, an embodiment of the focusing method of the present invention will also be explained (the same will apply to other embodiments).

The image-taking lens 1 made up of a plurality of lenses including the focusing lens 1a is position-controlled by the lens driving section 6 (e.g., linear motor and its driving circuit).

An optical image of an object is formed on the image pickup element 2 (e.g., CCD) which becomes the image pickup means through the image-taking lens 1. The image pickup element 2 photoelectrically converts the object image formed and outputs it as a time-series signal. The image signal generation circuit 3 applies various types of signal processing to the output of the image pickup element 2 and outputs a predetermined image signal CO (e.g., NTSC signal). Here, the various types of signal processing refer to analog/digital conversion, gain control, γ correction, brightness signal generation processing, color-difference signal generation processing, etc., and further includes aperture correction, noise reduction, etc., as required.

The focus signal detection circuit 4 integrates a brightness signal YE out of the time-series signals output from the image signal generation circuit 3 using the LPF 41, removes the noise component and then outputs a BP signal which has been differentiated by the HPF 42. The peak detection circuit 43 converts this signal to an absolute value, detects a peak value of a signal corresponding to a preset area (e.g., central 50% area of image-taking screen) in every horizontal scanning period, the addition circuit 44 further adds up these peak values (PK signals) for a vertical scanning period to generate a focus signal VF. This focus signal VF becomes a representative value corresponding to the degree of the contract of the object image and is input to the lens control circuit 5.

Here, how to decide an amount of lens movement at the lens control amount calculation circuit 503 in the lens control circuit 5 will be explained in detail.

As a method of deciding the amount of movement of the lens 1a based on the focus signal VF, for example, a threshold level LEV1 and threshold level LEV2 (LEV2>LEV1) are specified beforehand, and if VF<LEV1, the amount of movement is assumed to be MV1, if LEV1≦VF<LEV2, the amount of movement is assumed to be MV2 and if LEV2≦VF, the amount of movement is assumed to be MV3. Furthermore, when the in-focus vicinity decision circuit 505 decides that the in-focus position is close, the amount of movement is assumed to be MV4. Here, suppose the relationship between amounts of movement MV1, MV2, MV3 and MV4 is MV1>MV2>MV3>MV4. MV4 is assumed to be, for example, a minimum unit amount.

Then, the relationship between the focus signal VF and movement of the lens will be explained using FIG. 2.

Figure 2:
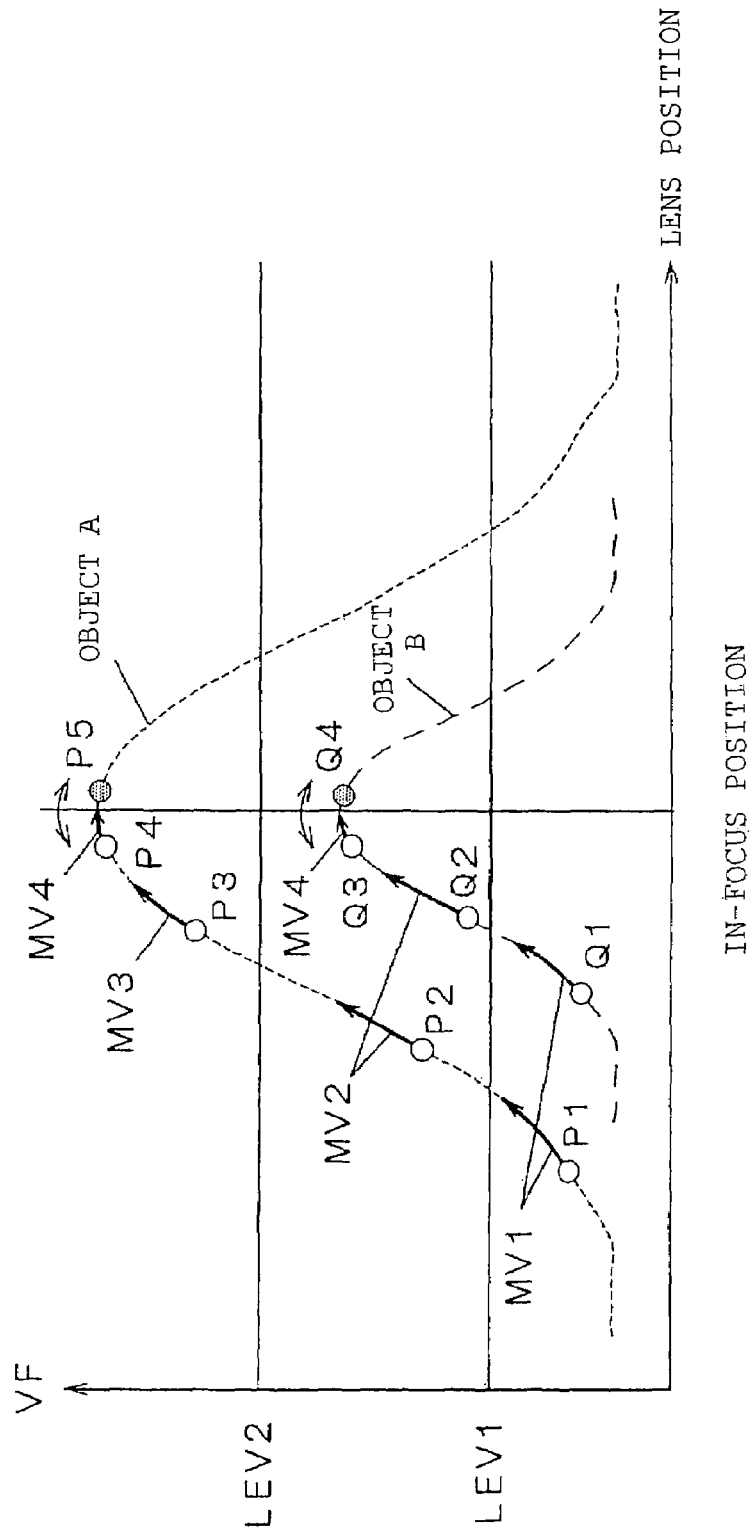
FIG. 2 is an image of a hill-climbing operation through control of an amount of lens movement according to Embodiment 1 of the present invention.

In FIG. 2, the X-axis shows the lens position of the focusing lens 1a and shows the focal position substantially at the center. The Y-axis shows the level of the focus signal VF. The characteristic of an object A shows a characteristic when the image-taking condition is good (when contrast and illumination are sufficient), while the characteristic of an object B shows a state in which the image-taking condition of the object is bad (low contrast, low illumination, etc.) LEV1 and LEV2 show threshold levels and MV1 to MV4 show amounts of movement of the lens. The amount of movement of MV1 to MV4 is expressed by the length of the arrow.

In FIG. 2, in the case of the object A, for example, when the lens position is P1, the focus signal VF is less than LEV1, and therefore the lens 1a moves to the in-focus position by the amount of movement MV1. When the lens 1a moves to the in-focus position and the level of the focus signal VF increases and exceeds LEV1 (the lens position at this time is P2), the lens moves to the in-focus position by replacing MV1 by MV2 which is a smaller amount of movement than MV1. Furthermore, when the level of the focus signal VF exceeds LEV2 (the lens position at this time is P3), the lens moves by replacing MV2 by MV3 which is a smaller amount of movement than MV2. Then, when the lens reaches the position of P4, the in-focus vicinity decision circuit 505 decides that the actual lens position is close to the in-focus position and changes the amount of movement to MV4 which is smaller than MV3. The method of deciding the vicinity of the in-focus position will be described later using FIG. 3. Then, when the lens 1a is moved by the amount of movement of MV4 and the lens 1a is moved to P5 past the in-focus position, the level of the focus signal VF decreases and therefore the lens 1a is moved backward and the lens 1a is brought closer to the in-focus position. The position where the level of the focus signal VF reaches the highest point is the in-focus position.

Then, in the case of the object B, when the lens position is Q1, the focus signal VF is less than LEV1, and therefore the lens 1a moves to the in-focus position by an amount of movement MV1. The lens 1a moves to the in-focus position and when the level of the focus signal VF increases and exceeds LEV1 (the lens position at this time is Q2), the lens moves to the in-focus position by replacing the amount of movement MV1 by MV2 which is an amount of movement smaller than MV1. When the lens position reaches Q3, the in-focus vicinity decision circuit 505 decides that the current lens position is close to the in-focus position and changes the amount of movement from MV2 to MV4. The method of deciding the vicinity of the in-focus position will be described later using FIG. 3. Then, when the lens 1a is moved by an amount of movement of MV4 and the lens 1a is moved to Q4 past the in-focus position, the level of the focus signal VF is decreased, and therefore the lens 1a is moved backward and brought closer to the in-focus position. The position where the level of the focus signal VF reaches the highest point is the in-focus position.

Thus, according to this embodiment, the amount of movement of the lens 1a becomes a minimum in the vicinity of the in-focus position independently of the object, and therefore it is possible to minimize disturbance of the image by hunting.

Furthermore, when MV4 is set to 0, the lens 1a is immediately stopped when it comes close to the in-focus position, and therefore it is possible to provide a stable image free of hunting.

Furthermore, providing an amount of movement MV4 for the vicinity of the in-focus position makes it possible to set larger values than conventional values for MV1, MV2 and MV3. This makes it possible to increase the moving speed of the lens 1a at positions not close to the in-focus position and improve responsivity.

Furthermore, when hill-climbing control accompanied by a wobbling operation is performed, if the in-focus vicinity decision result shows that the lens is close to the in-focus position, it is still possible to reduce wobbling of the image close to the in-focus position by reducing the amount of the wobbling amplitude.

Furthermore, if the lens is not in the vicinity of the in-focus position the amount of the wobbling amplitude can be set to a greater value than the conventional amount, and therefore it is easy to extract the variation component of the focus signal and easy to decide the in-focus direction. This makes it possible to achieve focusing with good responsivity even with conventional scenes and objects under low illumination and with low contrast which the hill-climbing method is not good at handling.

The amount of the wobbling amplitude is added to the amount of lens movement and output to the lens driving section 6 as the amount of lens control.

Then, details of the process in which the in-focus vicinity decision circuit 505 decides that the lens position is close to the in-focus position will be explained together with the behavior of the lens 1a using FIG. 3 and using the object B in FIG. 2 as an example.

Figure 3:
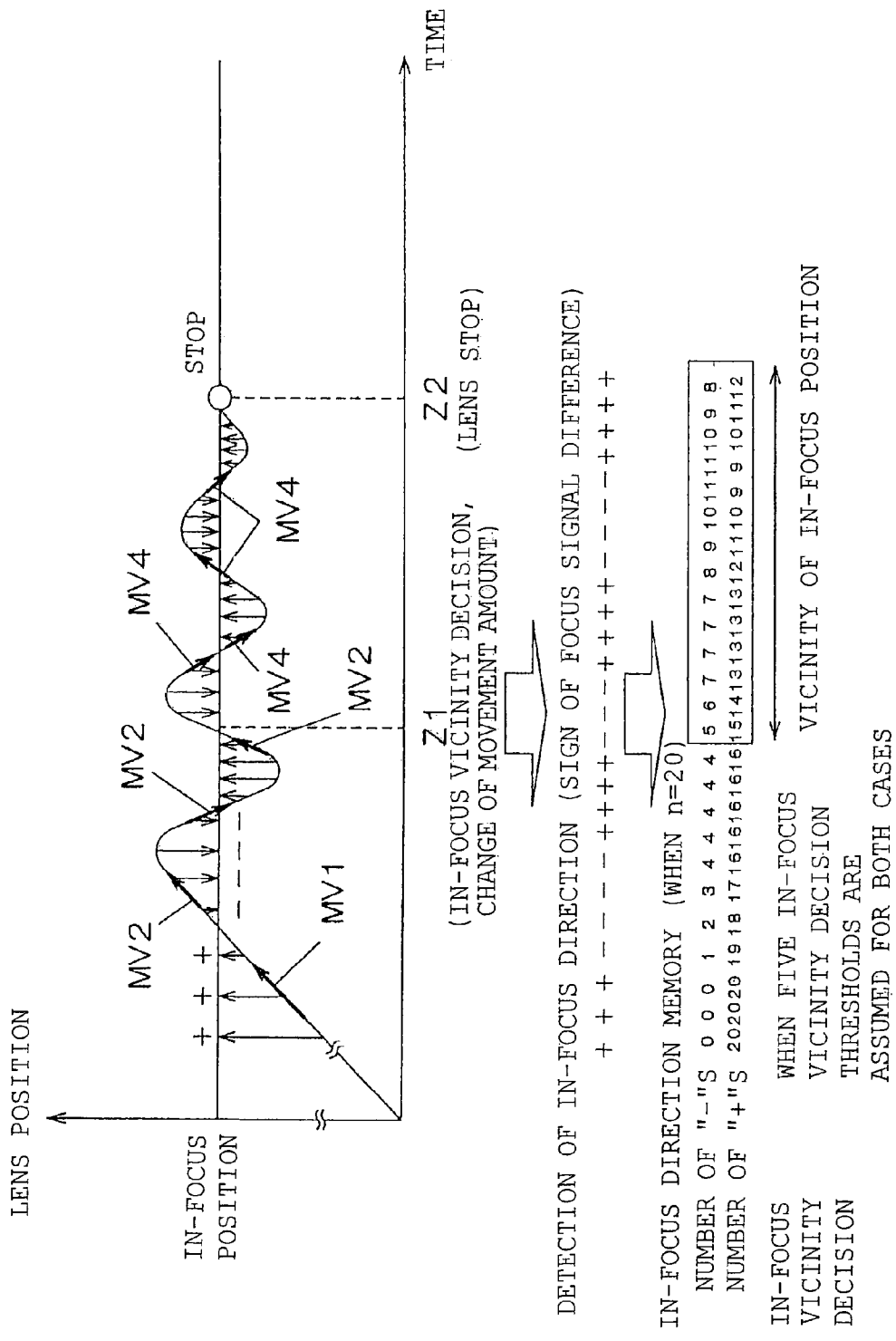
FIG. 3 is a schematic view of the behavior of a lens 1a according to the embodiment of the present invention in the case of an object B of Embodiment 1 of the present invention.

In FIG. 3, the X-axis shows a time and the Y-axis shows the lens position. When the operation is explained chronologically, the lens 1a is moved to the in-focus position by an amount of movement MV1 first. Since the in-focus direction at this time is a positive direction after the movement is started, the sign is positive (+direction). Therefore, the number of signs recorded in the in-focus direction memory 504 is also 20 "+"s and 0 "−"s.

Then, when the focus signal VF exceeds LEV1, the amount of movement changes from MV1 to MV2, and when the lens 1a further continues to move and exceeds the in-focus position, the in-focus direction becomes a negative direction, and therefore "−" signs are output from the in-focus direction decision circuit 502. The in-focus direction memory 504 stores the − signs and when four − signs are stored, the lens 1a passes through the in-focus position again. Then, the sign output from the in-focus direction decision circuit 502 becomes + again, and the number of + signs is added.

By repeating such an operation, when five − signs are stored in the in-focus direction memory 504, it is decided that the lens 1a has reached close to the in-focus position and the amount of movement is changed from MV2 to MV4. Then, the lens 1a is moved to the in-focus position by an amount of movement of MV4.

The lens control amount calculation circuit 503 stops the operation at timing (Z2 in FIG. 3) which is a predetermined time after timing (Z1 in FIG. 3) at which the in-focus vicinity decision circuit 505 decided that the lens was close to the in-focus position irrespective of the lens position of the focusing lens 1a.

Of course, in the in-focus state when the lens 1a is stopped, the lens position may be stopped slightly deviated from the in-focus position, but the amount of lens movement immediately before the lens is stopped is extremely small. For this reason, the focusing lens 1a can be stopped at a position extremely close to the in-focus position, and therefore the image may be slightly out of focus, but this is such a small level that presents no problem in terms of quality.

As shown above, according to this embodiment, since the lens 1a is moved by MV1 which is the largest amount of movement at a position not close to the in-focus position, it is possible to increase the speed of the lens 1a and the lens is moved close to the in-focus position by MV4 which is a small amount of movement, and therefore it is possible to realize control so as to move the lens slowly (delicately), which makes it possible to realize performance with total responsivity, stability, accuracy and high quality.

Moreover, since a moving image and a still image are taken according to different image-taking styles and also require different accuracy levels, it is possible to provide different amounts of movement between a moving image and still image and customize the balance of focusing performance to their respective optimum states.

The number of data pieces stored in the in-focus direction memory 504 is not limited to the above described value (20). If that number is smaller than 20, the memory scale can be reduced. On the contrary, increasing this number increases the amount of movement MV2 and amount of movement MV3, causes them to be wobbled across the in-focus position and has the advantage of being able to stably decide whether the lens is in the vicinity of the in-focus position even if the period for deciding the direction extends.

Furthermore, the threshold values used in the in-focus vicinity decision circuit 505 are not fixed to the above values (5 or more values in each direction). For example, if the number of threshold values is greater than 5, it is possible to reduce influences of noise and it is also easy to absorb differences in the period of an in-focus decision signal due to a difference in contrast of the object, which increases the accuracy of in-focus decision. On the contrary, reducing the number of threshold values improves the speed of in-focus vicinity decision leading to improvement of responsivity.

In short, it is possible to control the movement of the focusing lens 1a so that the speed of movement of the focusing lens 1a is reduced as the difference between (1) the number of in-focus direction signals indicating that the moved focusing lens 1a out of a stored immediately preceding predetermined number of in-focus direction signals is on the far side viewed from the in-focus position and (2) the number of in-focus direction signals indicating that the moved focusing lens 1a out of the stored immediately preceding predetermined number of in-focus direction signals is on the near side viewed from the in-focus position, is decreased.

Furthermore, the lens 1a is stopped at timing Z2 in FIG. 3 through the time control from the in-focus vicinity decision timing Z1 to Z2, but when an in-focus state is achieved through wobbling such as when a moving image is taken, it is also possible to continue the wobbling operation. However, when a still image is taken, performing a wobbling operation when the lens is stopped causes quality deterioration to become noticeable, and therefore the wobbling operation is stopped.

Furthermore, the period control from the in-focus vicinity decision timing Z1 to lens stop timing Z2 is done through time control, but it is also possible to perform memory count control such that the lens stop timing is determined when focus signals with at least a predetermined number (5 in this embodiment) of "+"s and "−"s are stored in the in-focus direction memory 504 from the in-focus vicinity decision timing Z1 onward a predetermined number of times consecutively.

In short, the focusing lens 1a can be stopped (a) after a predetermined time has elapsed after the aforementioned difference fell below a predetermined value or (b) after the aforementioned difference falls below a predetermined value a predetermined number of times consecutively.

The focus signal generating means of the present invention corresponds to the focus signal detection circuit 4, the in-focus direction signal generating means of the present invention corresponds to the in-focus direction decision circuit 502, the in-focus direction signal storing means of the present invention corresponds to the in-focus direction memory 504 and the focusing lens movement controlling means of the present invention corresponds to the means including the lens control amount calculation circuit 503 and the in-focus vicinity decision circuit 505.

EMBODIMENT 2

Then, mainly with reference to FIG. 4, a configuration and operation of an auto focusing apparatus of this embodiment will be explained.

Figure 4:
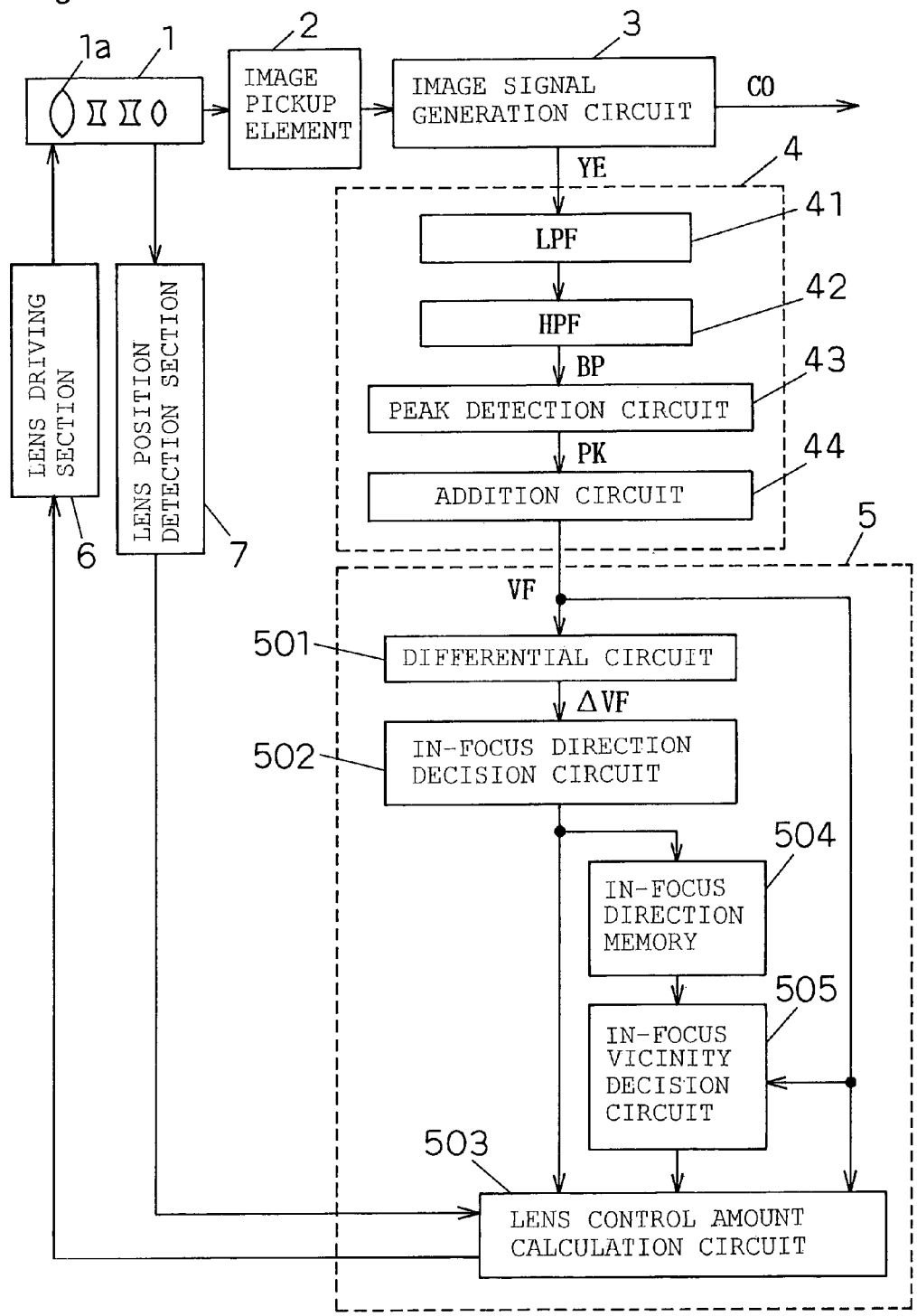
FIG. 4 is a block diagram showing a configuration of an auto focusing apparatus according to Embodiment 2 of the present invention.

FIG. 4 illustrates a configuration of Embodiment 2 of the present invention.

As the overall configuration, this embodiment is different from aforementioned Embodiment 1 in that it is provided with a lens position detection section 7 and a focus signal VF is also connected to an in-focus vicinity decision circuit 505. Explanations of the components assigned the same reference numerals will be omitted here.

Reference numeral 7 denotes a lens position detection section which is the lens position detecting means and detects the current position of the lens on the optical axis of a focusing lens 1a and is made up of, for example, an MR sensor (magnetic resistance element sensor) and its detection circuit. The information of the current position of the lens detected by the lens position detection section 7 is input to a lens control amount calculation circuit 503.

The lens position detection section 7 detects the current lens position and a lens control circuit 5 controls the next lens moving direction. and amount of movement while feeding back the current lens position.

Since lens position control is realized through feedback control, the possibility of a so-called out-of-synchronization phenomenon is reduced and it is possible to perform faster and more accurate position control of the lens 1a. This configuration is more effective if the lens driving section 6 is made up of a linear motor. That is, the linear motor can be driven faster than a stepping motor, and therefore it is possible to use a control method such that the lens control circuit 5 performs hill-climbing control up to a maximum (maximal) value of a focus signal VF while continuously applying wobbling and detecting the in-focus direction.

An advantage of continuously applying wobbling is that it improves trackability with respect to a movement of the object and variation in a scene and thereby improves responsivity drastically when an image-taking configuration is changed.

In such a configuration, the adaptive control of the amount of movement by in-focus vicinity decision of the present invention is extremely effective, improves responsivity, improves stability and increases the accuracy, too.

Furthermore, a focus signal VF is also input to the in-focus vicinity decision circuit in this embodiment. This improves the accuracy and reliability of in-focus vicinity decision. For example, when the focus signal is below a noise level, it is possible to decide that the in-focus direction decision result is considerably affected by noise and that the reliability of the data is low, and thereby avoid making any in-focus vicinity decision.

The focusing lens position detecting means of the present invention corresponds to the lens position detection section 7.

EMBODIMENT 3

Then, mainly with reference to FIG. 5, a configuration of an auto focusing apparatus of this embodiment will be explained.

Figure 5:
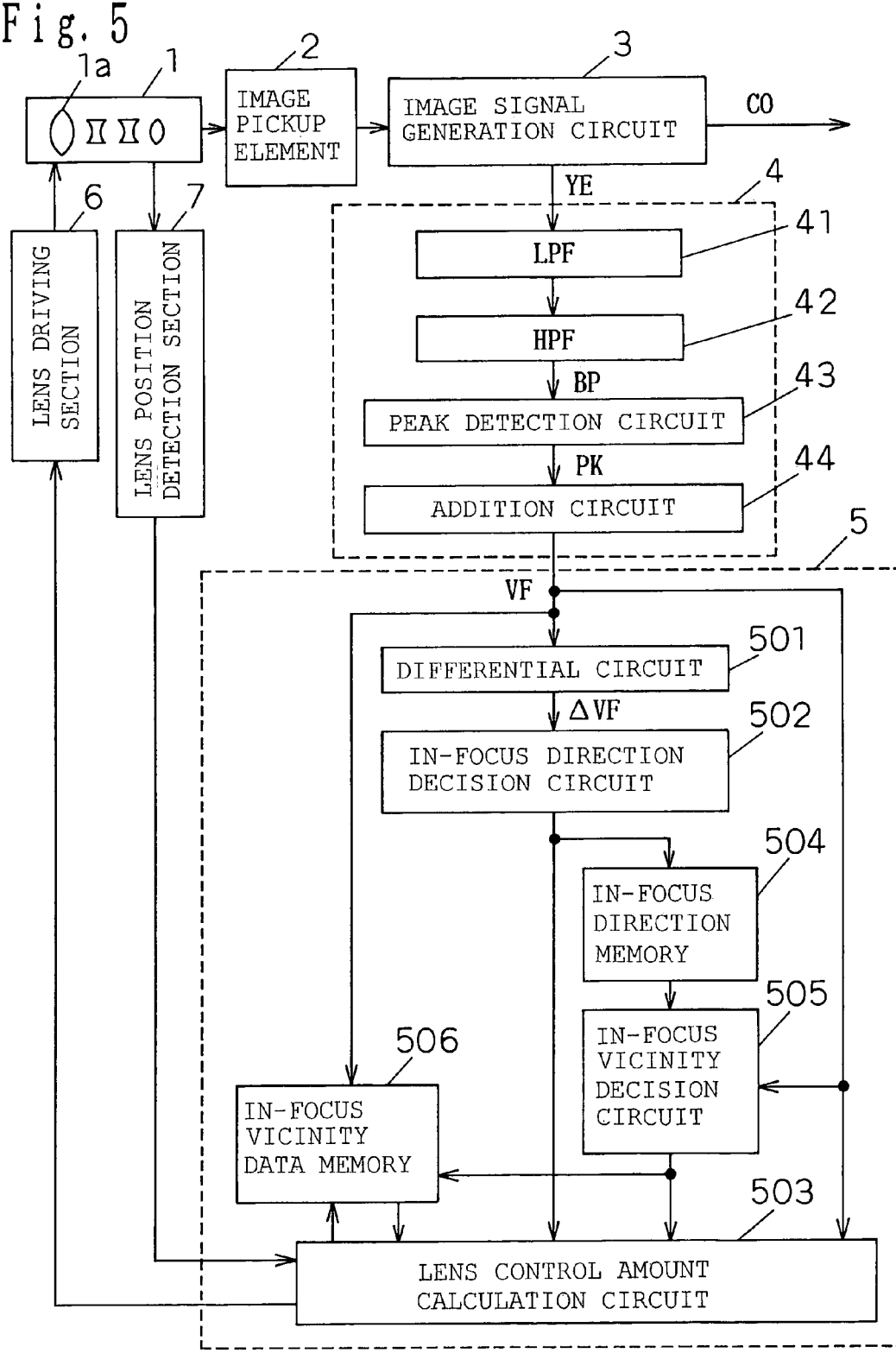
FIG. 5 is a block diagram showing a configuration of an auto focusing apparatus according to Embodiment 3 of the present invention.

FIG. 5 shows a configuration of Embodiment 3 of the present invention.

The overall configuration is different from aforementioned Embodiment 2 in that it is provided with an in-focus vicinity data memory 506. Explanations of the components assigned the same reference numerals will be omitted here.

Reference numeral 5 denotes a lens control circuit which is the lens controlling means, which is provided with a differential circuit 501, an in-focus direction decision circuit 502, a lens control amount calculation circuit 503, an in-focus direction memory 504, an in-focus vicinity decision circuit 505 and the in-focus vicinity data memory 506. The lens control amount calculation circuit 503 calculates the moving direction and amount of movement of a focusing lens 1a based on the output of the in-focus direction decision circuit 502, the level of a focus signal VF, the result of the in-focus vicinity decision circuit 505 and the data of the in-focus vicinity data memory 506 and outputs the information, on the amount of lens control to the lens driving section 6. The in-focus vicinity data memory 506 stores not only the focus signal VF but also the amount of lens control corresponding to a plurality of times of past lens movement (e.g., 20 times). This stored data is also overwritten sequentially starting from the oldest data as with the focus signal in such a way that data corresponding to the latest 20 times of lens movement is always stored.

Then, the operation of the auto focusing apparatus of this embodiment will be explained.

An image-taking lens 1 made up of a plurality of lenses including the focusing lens 1a is position-controlled by a lens driving section 6 (e.g., linear motor and its driving circuit). A lens position detection section 7 (e.g. MR sensor and its detection circuit) detects the current position of the lens on the optical axis of the focusing lens.

A focus signal detection circuit 4 integrates a brightness signal YE out of the time-series signal output from an image signal generation circuit 3 using an LPF 41, removes the noise component and outputs a BP signal which has been differentiated by an HPF 42. A peak detection circuit 43 converts this signal to an absolute value, detects a peak value of a signal corresponding to a preset area (e.g., central 50% area of image-taking screen) in every horizontal scanning period, an addition circuit 44 further adds up these peak values (PK signals) for a vertical scanning period and generates a focus signal VF. This focus signal VF becomes a representative value corresponding to the degree of the contract of the object image. This focus signal VF corresponding to a plurality of times of storage in the past (e.g., 20 times) is stored in the in-focus vicinity data memory 506 as the in-focus vicinity focus signal. This stored data is overwritten starting from the oldest data in such a way that data corresponding to the latest 20 times of storage is always stored.

Furthermore, the in-focus vicinity data memory 506 stores not only the focus signal VF but also the amount of lens control (which will be described later) from the lens control amount calculation circuit 503 corresponding to a plurality of times of storage in the past (e.g. 20 times). This stored data is also overwritten sequentially starting from the oldest data as with the focus signal in such a way that the data corresponding to the latest 20 times of storage is always stored.

Here, it is necessary to chronologically associate the in-focus vicinity focus signal stored in the in-focus vicinity data memory 506 with the amount of lens control in the vicinity of the in-focus position. As a specific example, for instance, assuming that data is stored at time intervals of 1 field and a time delay from the output timing of the amount of lens control of the lens control section 5 to the input timing for the focus signal VF to the lens control section 5 is, for example, 2 fields, timings are adjusted so that the recording timing for the in-focus vicinity data memory 506 is delayed by 2 fields with respect to the input timing for the in-focus vicinity data memory 506. Because this delay corresponds to 2 data pieces, if data is recorded by shifting the memory address by 2, data is stored associated with the same address.

The lens control amount calculation circuit 503 calculates the moving direction and amount of movement of the lens 1a based on the output of the in-focus direction decision circuit 502, the level of the focus signal VF, the result of the in-focus vicinity decision circuit 505 and the data of the in-focus vicinity data memory 506 and outputs the amount of control to the lens driving section 6.

When the in-focus vicinity decision circuit 505 does not decide that the lens is in the vicinity of the in-focus position, it does not use the data of the in-focus vicinity data memory 506 and decides the moving direction and amount of movement of the lens 1a according to the output result of the in-focus direction decision circuit 502 and the level of the focus signal VF. Furthermore, when the in-focus vicinity decision circuit 505 decides that the lens is in the vicinity of the in-focus position, it sees the data of the in-focus vicinity data memory 506 for the period during which the lens is in the vicinity of the in-focus position and regards the lens position when the level of the in-focus vicinity focus signal reaches a maximum value as the in-focus position. Then, when this lens 1a is stopped, the in-focus vicinity decision circuit 505 decides the final moving direction and amount of movement of the lens 1a using the amount of lens control in the vicinity of the in-focus position associated with the maximum value of this in-focus vicinity focus signal.

When the amount of movement of the lens 1a is adaptively changed according to whether the lens is in the vicinity of the in-focus position or not and the lens 1a is stopped according to this configuration and operation, it is possible to achieve accurate focusing by correcting the position of the lens 1a using the amount of lens control which takes the maximum value among the levels of past focus signals for the period during which the lens is in the vicinity of the in-focus position.

Of course, the position of the lens 1a at which the level of the focus signal becomes a maximum can be calculated accurately using various interpolation calculations.

The position of the lens 1a at which the level of the focus signal becomes a maximum is believed to often exist close to the position of the lens 1a where signs output from the in-focus direction decision circuit 502 as the in-focus direction signal changes.

Here, the relationship between the timing of stopping the lens 1a and responsivity and in-focus accuracy (lens stop variation) will be explained.

The step interval of the amount of lens control in the vicinity of the in-focus position stored in the in-focus vicinity data memory depends on the amount of movement of the lens 1a at that time. Therefore, when the lens 1a is stopped immediately after the in-focus vicinity decision circuit 505 decides that the lens is in the vicinity of the in-focus position, responsivity is good, but with regard to the accuracy of stopping of the lens 1a, the amount of lens control in the vicinity of the in-focus position becomes the step interval specified by the amount of movement other than the amount of movement MV4.

In contrast to this, by reducing the amount of lens movement to MV4 after the lens is decided to be in the vicinity of the in-focus position and stopping the lens when a predetermined time (e.g., 20 fields) has elapsed, the step interval is reduced, the variation when the lens is stopped decreases and it is possible to achieve more accurate stopping control.

Then, with reference to FIG. 6, details of the process in which the in-focus vicinity decision circuit 505 decides that the lens position is in the vicinity of the in-focus position will be explained using the object B in FIG. 2 as an example together with the behavior of the lens 1a.

Figure 6:
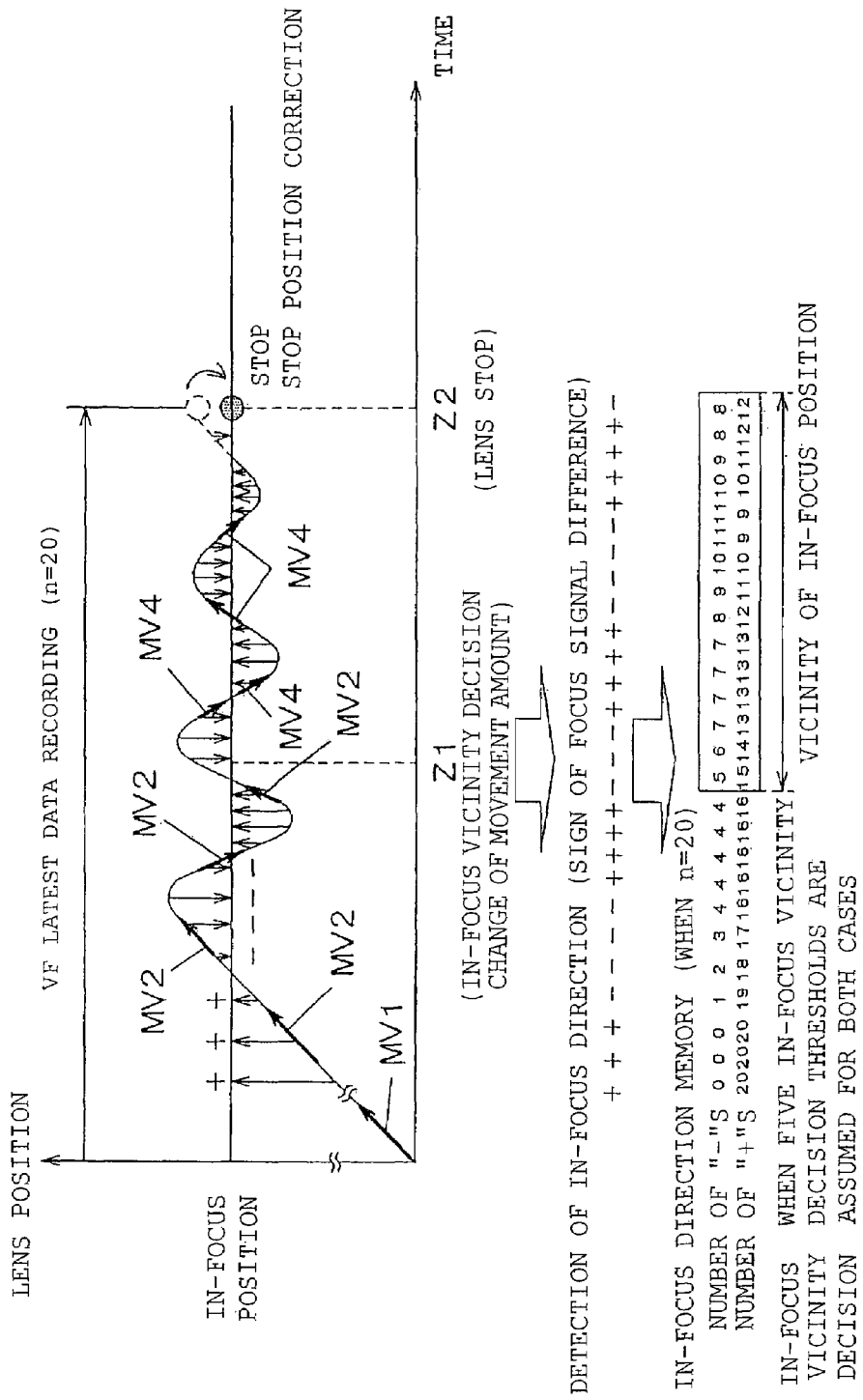
FIG. 6 is a schematic view of the behavior of a lens 1a according to Embodiment 3 of the present invention.

In the schematic view of lens movement in FIG. 6, the X-axis shows a time and the Y-axis shows the lens position. The operation will be explained chronologically using the figure. First, in FIG. 6, the lens 1a is moved to the in-focus position by an amount of movement MV1. Since the in-focus direction at this time is a positive direction after the movement is started, the sign is positive (+direction) as shown in FIG. 6. Therefore, the number of signs recorded in the in-focus direction memory 504 is also 20 "+"s and 0 "−"s. Then, when the focus signal VF exceeds LEV1, the amount of movement changes from MV1 to MV2, and when the lens 1a further continues to move and exceeds the in-focus position, the in-focus direction becomes a negative direction, and therefore the in-focus direction decision circuit 502 outputs "−" signs. "−" signs are stored in the in-focus direction memory 504 and at the timing at which four "−" signs are stored in the memory, the lens 1a passes through the in-focus position again. Then, the signs output from the in-focus direction decision circuit 502 become + again and the number of + signs is added. This operation is repeated and when five − signs are stored in the in-focus direction memory 504, the lens 1a is decided to be close to the in-focus position and the amount of movement is changed from MV2 to MV4. Then, the lens 1a is moved to the in-focus position by an amount of movement of MV4.

Then, the lens control amount calculation circuit 503 tries to stop the operation at timing (Z2 in FIG. 6) which is a predetermined time after timing (Z1 in FIG. 6) at which the in-focus vicinity decision circuit 505 decides that the lens is close to the in-focus position irrespective of the lens position of the focusing lens 1a. When the lens 1a is stopped, the lens position when the level of the in-focus vicinity focus signal stored in the in-focus vicinity data memory 506 reaches a maximum value (when the lens 1a passes through the in-focus position) is regarded as the in-focus position and it is possible to determine the moving direction and amount of movement of the lens 1a using the maximum value of this in-focus vicinity focus signal and the associated amount of lens control in the vicinity of the in-focus position and finally stop the lens 1a at the in-focus position.

By deciding whether the lens is in the vicinity of the in-focus position or not through the above described configuration and operation and stopping the lens using the data in the vicinity of the in-focus position, it is possible to improve responsivity in an area other than the vicinity of the in-focus position and improve the quality and accuracy in the vicinity of the in-focus position.

Moreover, since a moving image and a still image are taken according to different image-taking styles and also require different accuracy levels, it is possible to provide different amounts of movement between a moving image and still image and customize the balance of focusing performance to their respective optimum states.

Furthermore, as described above, by deciding that for a period during which the level of the focus signal VF does not exceed a predetermined value, the in-focus direction data is affected by noise and has low reliability and regarding the in-focus vicinity decision result as invalid or stopping the in-focus vicinity decision itself and always considering that the lens is not in the vicinity of the in-focus position, it is possible to make an accurate in-focus vicinity decision.

The amount of lens control stored in the in-focus vicinity data memory 506 need not be the data output to the lens driving means and it goes without saying that it is also possible to store the value corresponding to position information of the lens 1a (e.g., target position and current position) and convert the data to an amount of lens control.

Furthermore, this embodiment intends to improve responsivity and in-focus accuracy by providing a lens position detection circuit to perform position feedback control, but using, for example, a stepping motor to perform open control can also achieve similar effects in improving the accuracy and in this case the lens position detection circuit is no longer necessary and in this way it is possible to realize a cost reduction.

The focus signal level data storing means of the present invention corresponds to the in-focus vicinity data memory 506, the focusing lens position data storing means of the present invention corresponds to the in-focus vicinity data memory 506 and the focusing lens position correcting means of the present invention corresponds to the means including the lens driving section 6 and lens control amount calculation circuit 503.

As shown above, Embodiments 1 to 3 have been explained in detail.

The program of the present invention is a program to cause a computer to execute all or some steps (or procedures, operations or actions, etc.) of the above described focusing method of the present invention and a program that operates in cooperation with the computer.

Furthermore, the recording medium of the present invention is a recording medium that stores a program to cause a computer to execute all or some operations of all or some steps (or procedures, operations or actions, etc.) of the above described focusing method of the present invention and is also a computer-readable recording medium which allows the read program to execute the above described operations in cooperation with the computer.

The above described term "some steps (or procedures, operations or actions, etc.)" of the present invention refers to one or several steps out of those plurality of steps.

The above described term "operations of steps (or procedures, operations or actions, etc.)" of the present invention refers to operations of all or some of the above described steps.

A mode of use of the program of the present invention can also be one which is recorded in a computer-readable recording medium and which functions in cooperation with the computer.

A mode of use of the program of the present invention can also be one which is transmitted through a transmission medium, read by a computer and which operates in cooperation with the computer.

Furthermore, the above described computer of the present invention is not limited to pure hardware such as a CPU, but can also include firmware, OS or peripheral devices.

As described above, the configuration of the present invention may also be implemented by software or by hardware.

As described above, the above described configuration has made it possible to decide whether the lens is in the vicinity of the in-focus position or not with extremely high accuracy and adaptively change the amount of lens movement and thereby realize focusing with stability, high responsivity and high accuracy without causing any malfunction under wide object conditions and produce excellent autofocusing effects.

Providing such an auto focusing apparatus for a video camera or digital still camera makes it possible to obtain a moving image which is always stable and a high quality still image with high resolution without missing the right moment for releasing the shutter.

The present invention has advantages of being able to reduce disturbance, etc., of an image due to hunting and pick up a high definition moving image and high resolution still image.

The invention claimed is:

1. A focusing apparatus comprising:
   focus signal generating means of generating focus signals indicating the degree of focusing;
   in-focus direction signal generating means of generating in-focus direction signals indicating whether a focusing lens moved for focusing is on a far side or near side viewed from an in-focus position using said generated focus signals at predetermined time intervals;
   in-focus direction signal storing means of storing a plurality of said in-focus direction signals generated at the predetermined time intervals; and
   focusing lens movement controlling means of controlling movement of said focusing lens based on a predetermined plural number of immediately preceding in-focus direction signals out of said stored in-focus direction signals according to a predetermined rule.

2. The focusing apparatus according to claim 1, further comprising accumulation means of accumulating each of the stored in-focus direction signals,
   wherein said predetermined rule is a rule to reduce the speed of the movement of said focusing lens as the difference between (1) the number of in-focus direction signals, out of said immediately preceding accumulated in-focus direction signals, indicating that said moved focusing lens is on the far side viewed from the in-focus position and (2) the number of in-focus direction signals, out of said immediately preceding accumulated in-focus direction signals, indicating that said moved focusing lens is on the near side viewed from the in-focus position, is decreased.

3. The focusing apparatus according to claim 2, wherein the movement of said focusing lens is stopped (a) after a predetermined time has elapsed after the difference falls below a predetermined value or (b) after the difference falls below a predetermined value a predetermined number of times consecutively.

4. The focusing apparatus according to claim 3, further comprising:
   focus signal level data storing means of storing focus signal level data on the focus signal levels of said focus signals when said stored in-focus direction signals are generated;
   focusing lens position data storing means of storing focusing lens position data on the position of said focusing lens when focus signals having focus signal levels at which the focus signal level data are stored are generated; and
   focusing lens position correcting means of correcting the position of said focusing lens whose movement is stopped to the position of said focusing lens, of the positions of said focusing lens at which the focusing lens position data are stored, where a focus signal having a maximum focus signal level out of the focus signal levels at which the focus signal level data are stored is generated.

5. The focusing apparatus according to claim 3, wherein only when the focus signal level of said generated focus signal is equal to or higher than a predetermined value, the movement of said focusing lens is controlled based on said immediately preceding in-focus direction signals according to said predetermined rule.

6. The focusing apparatus according to claim 3, further comprising focusing lens position detecting means of detecting the position of said moved focusing lens,
   wherein the movement of said focusing lens is controlled considering the detected position of said focusing lens.

7. A focusing method comprising:
   a focus signal generating step of generating focus signals indicating the degree of focusing;

an in-focus direction signal generating step of generating in-focus direction signals indicating whether a focusing lens moved for focusing is on a far side or near side viewed from an in-focus position using said generated focus signals at predetermined time intervals;

an in-focus direction signal storing step of storing a plurality of said in-focus direction signals generated at the predetermined time intervals; and a focusing lens movement controlling step of controlling movement of said focusing lens based on a predetermined plural number of immediately preceding in-focus direction signals out of said stored in-focus direction signals according to a predetermined rule.

* * * * *

UNITED STATES PATENT AND TRADEMARK OFFICE
CERTIFICATE OF CORRECTION

| | | |
|---|---|---|
| PATENT NO. | : 7,593,054 B2 | Page 1 of 1 |
| APPLICATION NO. | : 10/489487 | |
| DATED | : September 22, 2009 | |
| INVENTOR(S) | : Kouichi Toyomura | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 891 days.

Signed and Sealed this

Twenty-first Day of September, 2010

David J. Kappos
*Director of the United States Patent and Trademark Office*